United States Patent Office 3,447,071
Patented May 27, 1969

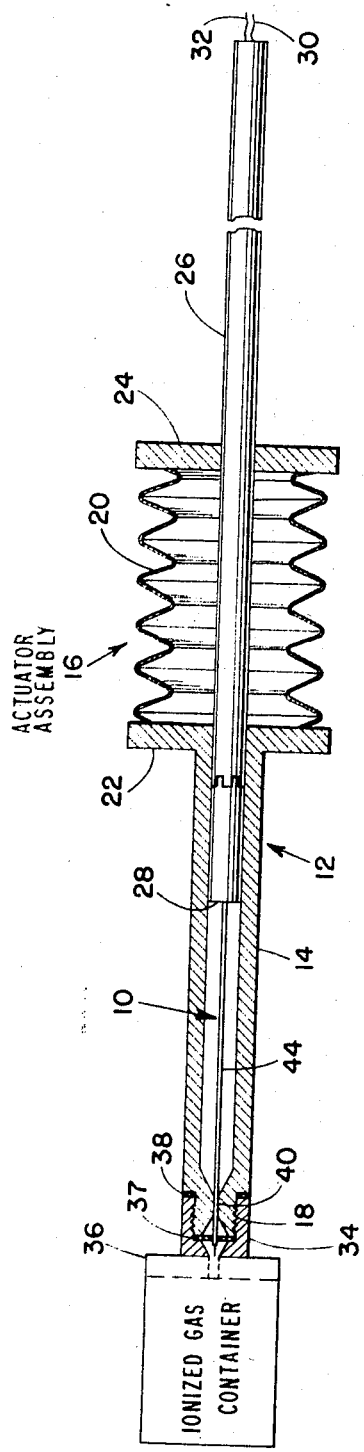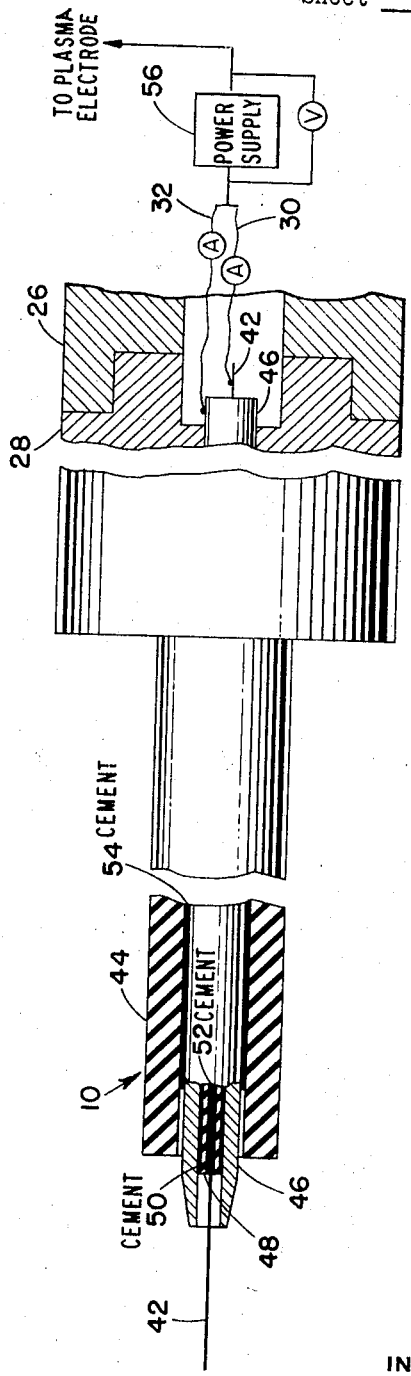

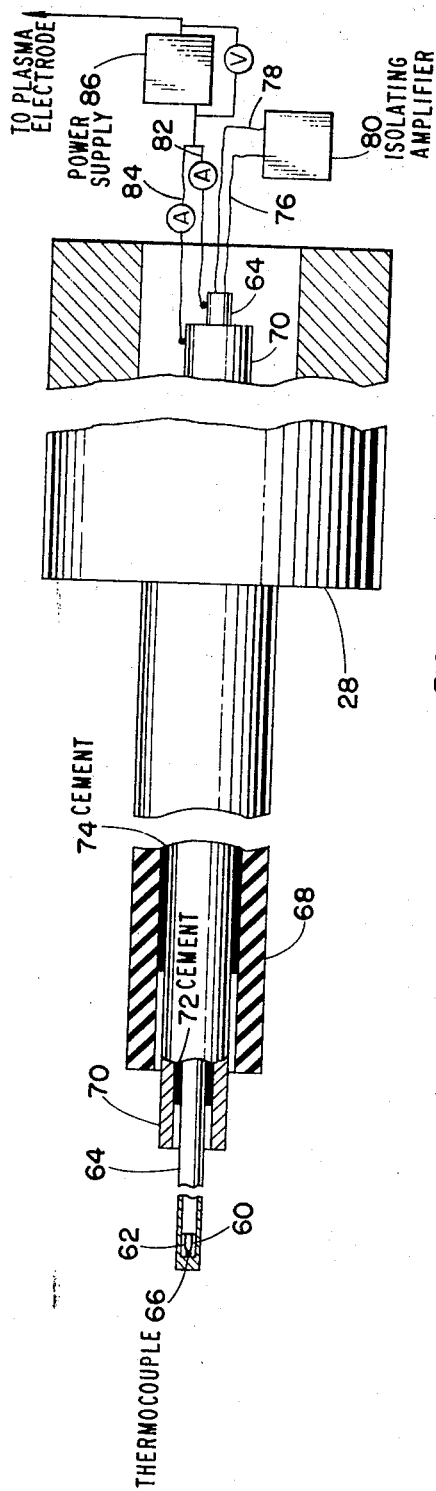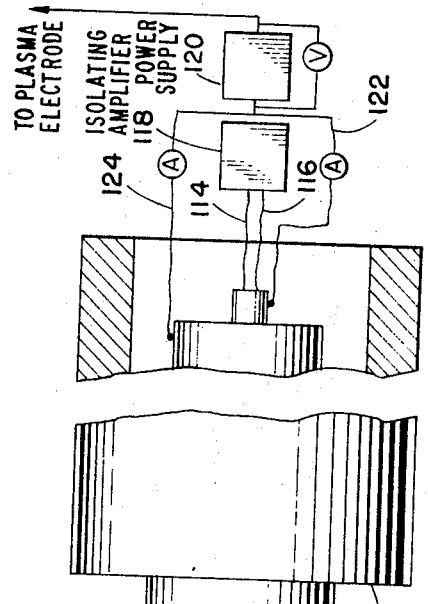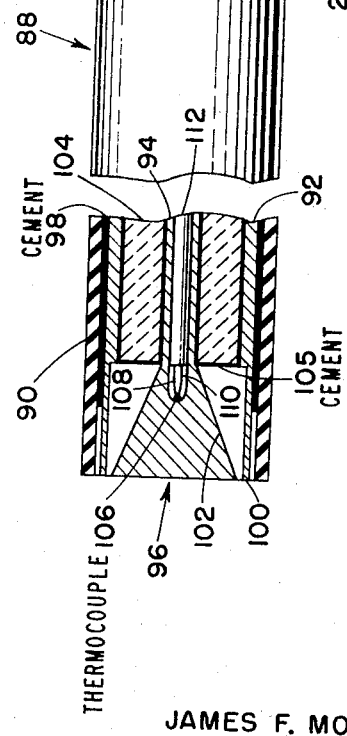

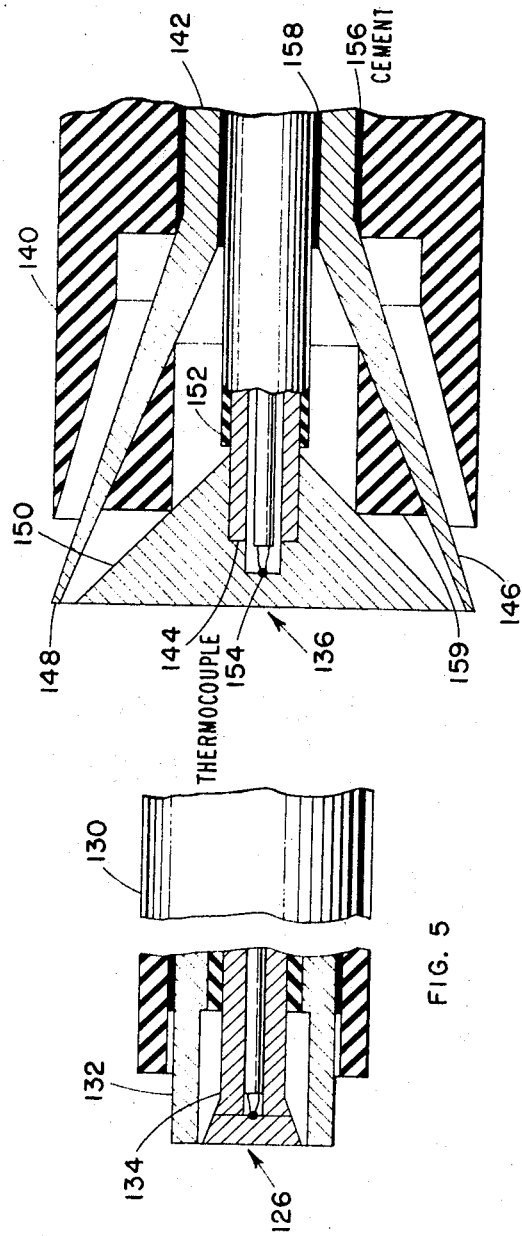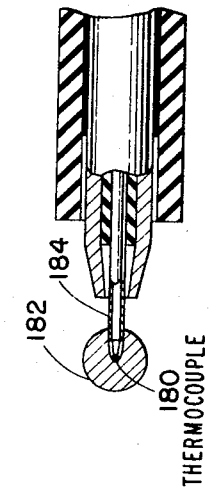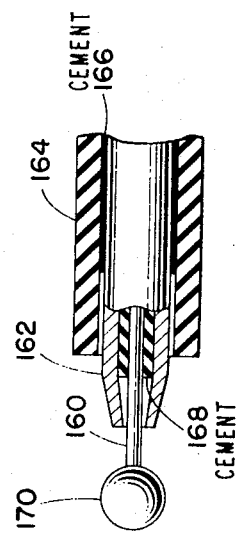

3,447,071
PROBES HAVING GUARD RING AND PRIMARY SENSOR AT SAME POTENTIAL TO PREVENT COLLECTION OF STRAY WALL CURRENTS IN IONIZED GASES
James E. Webb, Administrator of the National Aeronautics and Space Administration, with respect to an invention of James F. Morris, Parkview, and Richard F. Tischler, Cleveland, Ohio, and Paul Beckman, Huntington Valley, Pa.
Filed Sept. 22, 1965, Ser. No. 489,442
Int. Cl. G01k 7/04; G01r 1/06; H01j 1/88
U.S. Cl. 324—33                                               16 Claims

ABSTRACT OF THE DISCLOSURE

Both the primary sensor of a plasma probe and its guard ring are operated at the same electrical potential by connecting them to a common power supply. The guard ring is electrically isolated from the primary sensor and their currents are measured separately.

Statement of Government ownership

The invention described herein may be manufactured and used by or for the Government of the United States of America for governmental purposes without the payment of any royalties thereon or therefor.

This invention is concerned with sensors for measuring the properties of ionized gases and, more particularly, with small plasma probes having improved guard ring structures. The invention further relates to improved plasma probes having thermocouples for obtaining more reliable information and for enabling data obtained from the probes to be better interpreted in addition to enabling new data to be secured.

Various devices have been used in the past to measure the properties of ionized gases. Any object or device that contacts a plasma or neutral ionized gas accumulates a negative charge. This potential difference between the plasma and the contacting object develops because electrons in the plasma have much higher velocities than the velocities of the ions therein. Where the numbers of electrons and ions are equal and no net flow occurs, the wall or floating potential is a function of the electron and ion temperatures and weights alone. In this situation there is no net current, and the electron and ion currents to the object or device contacting the plasma are equal.

A probe can be placed in a plasma and connected through a variable potential, with appropriate instrumentation, to another electrical entry into the plasma, such as one of the electrodes used to generate the plasma or another probe. The probe potential can be varied from negative to positive relative to the plasma, and characteristic positive to negative currents, respectively, can be measured. From the voltage-current functions of these plasma probes, values for plasma properties can be obtained.

Because of their size, conventional probes cause local perturbations of the plasma being measured which effects the accuracy of the data obtained. These conventional probes collect wall currents as well as plasma currents which results in faulty data being obtained. This is particularly true where plasmas are produced from gases of conductors, such as mercury and cesium. It is likewise difficult to define the area through which the probes draw current because the effective outside surface area or the sheath area of a plasma probe is greater than the physical area of the probe itself.

These problems have been solved by probes constructed in accordance with the present invention which are very small in size and have guard rings near the primary sensor to prevent the collection of stray wall currents. The guard rings also enable the data obtained from the primary probes to be verified by acting as secondary probes. The guard rings further prevent the wall or floating (negative) potential of the dielectric supports for the probes from influencing the function of the primary sensors.

In general, the guard ring should be large enough to collect wall currents, to shield the primary sensor from the wall potential of the dielectric support, and to define the area of the primary sensor. However, the guard ring should be as small as possible, compatible with its guarding functions, to prevent the draining of excessive currents from the ambient plasma which would change the conditions being sensed by the primary sensor.

At the sensing tip the guard ring should approach the primary sensor as closely as can be maintained during operation yet be physically, and thereby electrically, separated from the sensor. If bridging by condensed conductors from the plasma threaten to short the guard ring to the primary sensor, the interposed gap can be increased slightly, or periodic heating by ion bombardment can be used to clear away the condensed conducting film.

The insulation between the guard ring and the primary sensor should be recessed. This removes the dielectric wall potential from between the guard ring and the primary sensor, aids in the prevention of bridging by condensed films, and helps define the primary area by quenching the plasma in the narrow gap.

It is also desirable for the guard ring to be separated from the outer dielectric support by a gap where the guard emerges from the support. The reasons for this are similar to those set forth above for the gap and recessed insulator between the guard ring and the primary sensor. Recessing the insulating seal thereby providing a gap between the outer dielectric support and the guard ring prevents bridging of conducting films from the dielectric support to the guard ring, allows the guard ring to perform its guard function more efficiently, and enables the guard ring to act as a more effective secondary probe.

It is, therefore, an object of the present invention to provide a device for measuring the properties of a plasma which is small in size to reduce the effect of its presence on the plasma being measured.

Another object of the invention is to provide a very small plasma probe having means for determining its temperature for more accurate data and to enable energy transfer coefficients to be estimated under various probe operating conditions.

A further object of the invention is to provide a small plasma probe having a guard ring near the primary sensor to prevent the collection of stray wall currents and to enable the primary probe data to be checked by acting as a secondary plasma probe.

These and other objects of the invention will be apparent from the specification which follows and from the drawings wherein like numerals are used throughout to identify like parts.

In the drawings

FIG. 1 is an axial section view of a supporting structure for mounting a plasma probe constructed in accordance with the present invention;

FIG. 2 is an enlarged axial section view of a cylindrical plasma probe constructed in accordance with the present invention that is adapted to be mounted in the supporting structure shown in FIG. 1;

FIG. 3 is an enlarged axial section view of an alternate embodiment of a cylindrical plasma probe constructed in accordance with the present invention which includes a thermocouple;

FIG. 4 is an enlarged axial section view of a plasma probe having a planar tip constructed in accordance with the present invention that is adapted to be mounted in the supporting structure shown in FIG. 1;

FIG. 5 is an enlarged axial section view of an alternate embodiment of the planar plasma probe shown in FIG. 4 having an extended tip;

FIG. 6 is an enlarged axial section view of a planar plasma probe utilizing an alternate embodiment of the guard rings shown in FIGS. 4 and 5;

FIG. 7 is an enlarged axial section view of a spherical plasma probe constructed in accordance with the present invention that is adapted to be mounted in the supporting srtucture shown in FIG. 1; and FIG. 8 is an enlarged axial section view of an alternate embodiment of the spherical plasma probe shown in FIG. 7 which includes a thermocouple.

Referring now to the drawings, there is shown in FIG. 1 an improved cylindrical plasma probe 10 mounted in a support 12 which protects the probe in transit and provides a vacuum tight actuating mechanism while properly positioning the probe when in use. The support 12 includes a tubular housing 14 having an actuator assembly 16 secured to one end and a threaded tip 18 at the opposite end.

The actuator assembly 16 includes a bellows 20 interposed between a front wall in the form of a plate 22 mounted on the housing 14 and a rear wall formed by a plate 24 that is secured to an actuator rod 26 to provide a vacuum tight seal. The actuator rod 26 extends through the bellows 20 into the housing 12 to engage a base 28 on the probe 10 which is free to reciprocate along the bore of the housing.

Power leads 30 and 32 for the various components of the probe 10 extend through the base 28 and actuator rod 26 as will be explained later in more detail.

An internally threaded cap 34 is mounted on the threaded tip 18 to protect the probe 10 in transit. The cap 34 is removed from the tip 18 and welded to the outside surface of a wall 36 of a chamber containing the ionized gases to be studied when it is desired to use the probe 10. The interior of the housing 14 and the inside of the plasma chamber is sealed vacuum tight by the weld between the cap 34 and wall 36 together with deformable seals 37 and 38 between the cap and the threaded tip 18.

When it is desired to use the probe 10, the actuator rod 26 is moved toward the cap 34 which compresses the bellows 20 and causes the base 28 to slide along the bore of the housing 14 which moves the probe to an extended position. During this movement the probe 10 is guided through an aperture in the cap 34 into an aligned aperture in the wall 36 by a reduced diameter section 40 within the tip 18 and a central opening in the seal 37. Movement of the actuator rod 26 in the opposite direction moves the probe 10 to a retracted position in the housing 14 shown in FIG. 1.

Referring now to FIG. 2, there is shown the construction of the cylindrical plasma probe 10 that is adapted to be mounted in the support 12. The probe 10 has a primary sensor 42 formed by a wire of electrically conducting material, such as tantalum, having an extremely small diameter from 0.0005 to 0.001 inch. Although tantalum is preferred for the primary sensor 42, tungsten and niobium may be used for this purpose. These materials are refractory conductors with coefficients of expansion near those of the desired refactory dielectrics, such as aluminum oxide. Niobium is a desirable material because its coefficient of expansion is quite similar to that of aluminum oxide. Also nickel has been a satisfactory material for the sensor. Refractory materials extend the temperature range for probe operation while the matched expansion coefficients reduce the tendency of the probe components to seprate because of differences in expansion at elevated temperatures.

The primary sensor 42 extends outward from a tubular insulator 44 that is mounted on the base 28 shown in FIGS. 1 and 2. By way of example, aluminum oxide tubing having an outside diameter of 0.025 inch and an inside diameter of 0.011 inch has been satisfactory for this insulator.

During operation in plasmas of electrically conducting material, such as cesium and mercury, conducting films can collect on all exposed surfaces by condensation from the plasma. A shield 46 prevents this conducting film from shorting the insulator 44 to the primary sensor 42 thereby making it difficult to ascertain the actual collecting area of the probe 10. The shield 46 comprises a tube of electrically conducting material having a small outside diameter and an inside diameter large enough to receive the wire forming the primary sensor 42. Tantalum tubing having an outside diameter of 0.008 inch and an inside diameter of 0.004 inch has been satisfactory for this purpose. Here again, nickel has been a satisfactory material for the shield 46 while tungsten and niobium are likewise satisfactory. The primary sensor 42 and the shield 46 should operate at the same potential. Therefore, the shield 46 must be made of the same material as the primary sensor 42 to present the same surface potential to the plasma when the shield and primary sensor are identically biased.

The primary sensor 42 extends through the shield 46 and is separated therefrom by a recessed insulator 48. Silicon oxide tubing having an outside diameter of 0.0026 inch and an inside diameter of 0.002 inch has been a satisfactory material for use in plasmas which do not contain alkali metals. Aluminum oxide cements are used for applications where alkali metals are present.

The insulator 48 is retained in the shield 46 by a layer 50 of refractory dielectric cement which forms a recessed vacuum seal while a similar layer 52 of refractory dielectric cement supports the primary sensor 42 in the recessed tubular insulator 48. Still another layer 54 of refractory dielectric cement is utilized to mount the shield 46 in the insulator 44.

Two gaps formed by the recessed seals 50 and 54 together with the interposed shield 46 prevent bridging of a condensed conducting film on the dielectric insulator 44 to the primary sensor 42. If such a film were to connect the primary sensor 42 to the dielectric insulator 44, all of the wall surfaces connected by the conducting film would collect current from the plasma and feed them to the primary sensor.

Likewise, every attempt must be made to prevent bridging of a condensed conducting film from the dielectric insulator 44 to the shield 46 because this would permit collection of plasma currents by the connected wall surfaces. Such bridging would alter the plasma from the state being sensed by the primary sensor 42. The gap at the end of the recessed seal 54 between the dielectric insulator 44 and the shield 46 prevents this bridging by the condensed film. The long narrow gap quenches the plasma and opposes diffusion of the condensing material towards the recessed seal. If any bridging does occur, the condensed film can be evaporated by ion bombardment from the plasma.

The primary sensor 42 protrudes outward from the shield 46 a short distance as shown in FIG. 2. Both the primary sensor 42 and the shield 46 are connected in parallel through current detectors to the same power supply and voltage detector 56 by leads 30 and 32, respectively. These leads extend through the base 28 and the actuator rod 26 as shown in FIGS. 1 and 2.

If the temperature of a probe sensor is known, the cycling rate of the power supply can be adjusted until no temperature changeover of the voltage cycle is indicated. This eliminates any problems of variables caused by a changing work function which yields a changing contact potential between the probe sensor and the plasma.

The temperature of a cylindrical probe of the type shown in FIG. 2 can be ascertained by mounting a thermocouple in the probe in the manner shown in FIG. 3 while the diameters of components remain comparable with those for conventional plasma probes. In this embodiment two wires 60 and 62, each having a diameter of 0.0005 inch in a two-hole three-mil quartz tube are connected to the tip of a sensor 64 in the form of tantalum tubing having an outside diameter of 0.005 to 0.01 inch to form a hot junction 66. Here again, nickel tubing has been used for the sensor 64 while tungsten, tantalum, or niobium can likewise be used. The sensor 64 extends through an insulator 68 of aluminum oxide tubing having an outside diameter of 0.045 inch and an inside diameter of 0.030 inch. A shield 70 surrounds the sensor 64 and extends through the insulator 68. A layer 72 of refractory dielectric cement insulates the sensor 64 from the shield 70 and forms a vacuum seal while a similar layer 74 forms a vacuum seal between the shield 70 and the insulator 68.

Leads 76 and 78 from an isolating amplifier 80 extend through the actuator rod 26 shown in FIG 1 and are connected to the thermocouple wires 60 and 62. Leads 82 and 84 are connected to the sensor 64 and shield 70 respectively. Leads 82 and 84 extend through the actuator rod 26 shown in FIG. 1 and are connected in parallel through current detectors to the same power supply and voltage detector 86.

The primary sensors 42 and 64 of the cylindrical probes shown in FIGS. 2 and 3 are hampered by end effects where collection areas defy definition. Therefore, the longer the cylindrical collection surface by comparison with the effective diameter the better the cylindrical probe. However, high length to diameter ratios prevent local sensing of conditions and draw excessive plasma currents which alter the local conditions of the plasma. Probes having configurations other than cylindrical must be relied upon for the taking of local measurements in a plasma because measurements taken with cylindrical probes refer to that portion of the plasma that extends along the length of the sensor from the shield to the tip.

Where directional adjustment is desired, a probe having a planar tip is preferred because this tip best defines the current collection area. Such a probe 88 is shown in FIG. 4 and can be mounted in the support 12 in the manner utilized to carry the probe 10 shown in FIG. 1.

The probe 88 comprises three concentric tubes 90, 92, and 94 which terminate at a planar tip 96. By way of illustration, this probe has been constructed using an aluminum oxide outer tube 90 as a casing having an outside diameter of 0.045 inch and an inside diameter of 0.030 inch. A tantalum intermediate tube 92 forming an electrical conductor having an outside diameter of 0.027 inch and an inside diameter of 0.020 inch has been used with a layer 98 of refractory dielectric cement between the outer casing 90 and the tubular conductor 92 to form a vacuum seal. As previously mentioned, nickel has likewise been used for the intermediate tube 92 while tantalum and niobium may also be used for this purpose.

The end of the tube 92 in the plane of the tip 96 forms a guard ring 100, and the insulating cement 98 is recessed from the tip 96. A tantalum inner tube 94 with an enlarged end 102 has an outside diameter of 0.010 inch and an inside diameter of 0.006 inch. The inner tube 94 is properly positioned by a quartz tube 104 having an outside diameter of 0.018 inch and an inside diameter of 0.011 inch with a refractory dielectric cement layer 105 forming a vacuum seal between the quartz tube 104 and the tantalum tubes 92 and 94. The refractory dielectric cement layer 105 completely covers the exposed end of the quartz tube 104.

A thermocouple 106 has a hot junction in the enlarged end 102 of the tube 94 formed by a pair of 0.0005 inch chromel/constantan wires 108 and 110 in a 0.003 inch silicon oxide two-hole insulator 112. The wires 108 and 110 may be tungsten, tungsten-rhenium, or other high temperature thermocouple material. The enlarged end 102 of the tube 94 adjacent the thermocouple 106 has a defined flat surface in the plane of the guard ring 100.

In operation, a pair of thermocouple leads 114 and 116 connect the wires 108 and 110 to an isolating amplifier 118. The guard ring 100 and the primary sensor formed by the enlarged end 102 are connected in parallel through current detectors to the same power supply and voltage detector 120 by leads 122 and 124, respectively, which extend through the actuating rod 28 shown in FIG. 1. The currents through the guard ring 100 and the primary sensor 102 are then measured.

FIG. 5 illustrates a modification of the planar probe shown in FIG. 4. In this embodiment the probe has a substantially planar tip 126 that is similar to the tip 96 of the probe 88. The probe of FIG. 5 likewise comprises three concentric tubes 130, 132 and 134 which are identical in construction with the tubes 90, 92 and 94 of the probe 88. However, the planar tip 126 of the probe shown in FIG. 5 extends beyond the outer casing 130. Satisfactory results have been obtained from such a probe wherein the planar tip 126 extends about 0.005 to 0.010 inch beyond the casing 130.

FIG. 6 is a greatly enlarged view of still another modification of the planar probe shown in FIG. 4 which has a maximum tip area and a minimum outer diameter to reduce perturbations in the plasma. This probe has a substantially planar tip 136 with a surface area approximately the same as that of the tips 96 and 126. The probe comprises three concentric tubes 140, 142 and 144 which are similar to the tubes 90, 92 and 94 of the probe 88. The outer insulating tube 140 is of aluminum oxide and has an outside diameter of 0.025 inch. The intermediate tube is fabricated from tantalum tubing having an outside diameter of 0.010 inch and has a conically shaped flared end 146 which terminates the plane of the planar tip 136 to form a guard ring 148. The outside diameter of the guard ring 148 is substantially the same as that of the outer tube 140.

A conically shaped tantalum tip 150 is rigidly mounted on the end of the inner tube 144 which is likewise tantalum tubing having an outside diameter of 0.004 inch. An aluminum oxide insulator 152 covers the tube 144.

A thermocouple 154 is contained in the tip 150. The thermocouple 154 is similar to the thermocouple 106 illustrated in the embodiment of FIG. 4. A layer 156 of refractory dielectric cement mounts the guard ring tube 142 within the outer insulating tube 140 and forms a vacuum seal. A similar layer 158 of refractory dielectric cement mounts the inner tube 144 forming the primary sensor within the tube 142.

An aluminum oxide insert 159 is interposed between the tip 150 and the flared end 146. The insert 159 engages the tip 150 as well as the flared end 146 and serves to maintain the spacing between the tip and the flared end while protecting the refractory dielectric cement layer 158 from damage from the plasma.

While the probes shown in FIGS. 4, 5 and 6 are desirable for taking local measurements in the plasma, a probe having a spherical tip can likewise be used for this application. The spherical tip configuration is advantageous because its geometry is easily analyzed inasmuch as the effective area of the probe, considering the sheath covering of the tip, is readily determined when this configuration is used. Such a probe is shown in FIG. 7.

A support 160 of electrically conducting material having a very small diameter is utilized by the probe shown in FIG. 7. By way of example, 0.002 inch diameter tantalum wire has been successfully used for this purpose. The support 160 extends through a hollow shield 162 of electrically conducting material that is mounted in an insulator 164. The shield 162 is in the form of tubing, and tantalum tubing having an outside diameter of 0.010 inch and an inside diameter of 0.006 inch has been used to shield the 0.002 inch diameter wire support. As illustrated in FIG. 7 the shield 162 is tapered at the outer end.

Aluminum oxide tubing having an outside diameter of 0.025 inch and an inside diameter of 0.011 inch has been utilized for the insulator 164 to support the shield 162. A layer 166 of refractory dielectric cement is interposed between the shield 162 and the insulator 164 to form a vacuum seal. Likewise, a similar layer 168 is used to form a vacuum seal between the sensor 160 and the shield 162.

A spherical tip 170 is mounted on the end of a support 160 to form a primary sensor. The spherical tip 170 has a diameter of 0.010 inch and is electrically connected through the support 160 to a suitable power supply and the shield 162 is likewise connected to the same power supply in the manner previously described.

FIG. 8 shows an alternate embodiment of the spherical tip probe shown in FIG. 7. In this embodiment, a two wire thermocouple 180 is mounted within a spherical tip 182 that is carried on the end of a hollow support 184. Utilizing a thermocouple with the spherical tip the rate of change of temperature with the rate of change of energy can be determined. This facilitates the determination of the overall energy transport coefficient of the probe in addition to usual plasma probe results.

While a number of embodiments of the invention have been disclosed and described, it will be appreciated that various structural modifications may be made without departing from the spirit of the invention or the scope of the subjoined claims. For example, the previously described miniaturized plasma probes having guard rings are ideally suited to conduct A.C. signals up to tens of thousands of megacycles per second to particular selected points in plasmas where these signals are radiated.

It is contemplated that a small coaxial cable may be substituted for the leads 30 and 32 with the outer cylindrical conductor tapering and joining the guard ring tube. The inner conductor also tapers and joins the primary sensor. Coaxial cables also may be used in place of the leads 82 and 84 as well as 122 and 124.

In this embodiment the coaxial cable function is extended to the sensor tip. This enables the electrostatic and electromagnetic A.C. characteristics of the plasma to be studied with a single probe. The coaxial construction confines the A.C. signal until it radiates from the sensor tip thereby preventing interaction with a large plasma region while conducting the signal with less losses than with individual noncoaxial leads. With such a modification localized studies of plasma penetration depths, amplification and randomization of longitudinal plasma oscillation and transmission can be made. Also, studies of transmission characteristics for frequencies less than, near or equal to, and greater than the plasma frequency can be made.

While the probes have been described in connection with studying ionized gases, it will be appreciated the probes can be used in other applications. This is especially true for the probes containing thermocouples.

What is claimed:
1. Apparatus for supporting and containing a probe of the type used to measure the properties of ionized gases in a container, said apparatus comprising
   an elongated tubular housing adapted to receive the probe,
   a cap removably mounted on one end of said housing for protecting a tip on the probe during transit, said cap being adapted to be secured to the wall of said container for positioning the probe for insertion into the container,
   actuator means on the opposite end of said housing for moving the probe towards said cap into said container while maintaining vacuum, said actuator means including
   a first plate secured to an end of the tubular housing opposite the cap,
   a bellows having one end secured to said first plate,
   a second plate secured to the opposite end of said bellows, and
   an actuator rod extending through said first and second plates into the elongated tubular housing, said actuator rod being rigidly connected to said second plate.
2. Apparatus as claimed in claim 1 including sealing means between the cap and the end of the housing for providing a vacuum tight seal therebetween when the cap is secured to the wall of the plasma container.
3. In combination with a container for ionized gases having a wall with an aperture therein,
   a threaded member on said wall having an axially extending aperture in substantial alignment with the aperture in substantial alignment with the aperture in the wall of the container,
   an elongated vacuum tight housing extending outward from the wall of the container and having an end threadably connected to said threaded member,
   a probe mounted for reciprocation within said housing, said probe comprising a plurality of concentric tubular members terminating in a tip within said threaded member, and
   actuator means for moving said probe from a retracted position within said housing wherein said tip is in said threaded member to an extended position wherein said probe protrudes through said aperture in said threaded member and the aperture in the container wall for positioning said tip in the ionized gases.
4. The combination as claimed in claim 3 including a reduced diameter section within the threaded member for guiding the probe through the aligned apertures.
5. In combination with a container of ionized gases having a wall with an aperture therein,
   a threaded member having an axially extending aperture therein in substantial alignment with the aperture in the wall of the container, said member being rigidly mounted on the wall of the container with a vacuum tight seal,
   an elongated member having a bore therein extending outward from the wall of the container and having an end threadably connected to said threaded member,
   means for sealing the connection between said elongated member and said threaded member,
   a probe mounted for reciprocation within said bore of said housing, said probe comprising
   an outer tubular member having one end within said threaded member,
   an intermediate tubular member mounted within said outer tubular member having an end portion extending outward from said one end of said outer tubular member within said threaded member, and
   a primary sensor mounted within said intermediate tubular member having a tip portion extending outward from said end portion of said intermediate tubular portion,
   actuator means for moving said probe in said bore, and
   means within said elongated member for engaging said outer tubular member for guiding said probe into said aligned apertures.
6. A probe for measuring the properties of ionized gases comprising,
   a base,
   a tubular insulator extending outward from said base,
   an electrically conducting tube mounted within said insulator and extending outward from an end thereof remote from said base,
   a cylindrical sensor of electrically conducting material mounted within said tube and extending outward therefrom, said sensor comprising a length of tubing,
   a thermocouple mounted in said tubing to determine the temperature of said sensor, and
   means for connecting said sensor and said tube to the same electrical potential whereby said tube shields said sensor by preventing a conductive layer from extending from said sensor to said insulator.
7. A probe as claimed in claim 6 wherein the sensor comprises
   a wire having a diameter between 0.0005 to 0.001 inch.
8. A probe for measuring the properties of ionized gases comprising
   a base, a tubular insulator extending outward from said base,
an electrically conducting tube mounted concentric with said insulator,
a sensor of electrically conducting material mounted within said tube, the ends of said tube and said sensor remote from said base being substantially coplanar,
means for maintaining said sensor and said tube potentially equal whereby the end of said tube shields the coplanar end of said sensor by preventing a conductive layer on said coplanar end from extending to said insulator,
first current detecting means for measuring the current in said sensor, and
second current detecting means for measuring the current in said electrically conducting tube.

9. A probe as claimed in claim 8 wherein the sensor has an enlarged end with a substantially flat surface coplanar with the end of the shielding tube remote from the base.

10. A probe for measuring the properties of ionized gases comprising
a base,
a tubular insulator extending outward from said base,
an electrically conducted tube mounted concentric with said insulator,
a sensor of electrically conducting material mounted within said tube, the ends of said tube and said sensor remote from said base being substantially coplanar, said sensor having an enlarged end with a substantially flat surface coplanar with the end of said electrically conducting tube remote from said base, said electrically conducting tube having a flared end terminating in the plane of the flat surface of the end of the sensor, the outside diameter of said flared end in said plane being substantially the same as the outside diameter of the tubular insulator, and
means for maintaining said sensor and said electrically conducting tube potentially equal whereby the end of said electrically conducting tube shields the coplanar end of said sensor by preventing a conductive layer on said coplanar end from extending to said insulator.

11. A probe as claimed in claim 8 wherein the end of the tubular insulator remote from the base is substantially coplanar with the ends of the shield and sensor.

12. A probe as claimed in claim 8 wherein the coplanar ends of the sensor and shielding tube extend outward from the end of the tubular insulator remote from the base.

13. A probe as claimed in claim 8 including a thermocouple within the end portion of the sensor remote from the base.

14. A probe for measuring the properties of ionized gases at a predetermined point comprising,
a base,
a tubular insulator extending outward from said base,
an electrically conducting tube mounted within said insulator,
an electrically conducting support mounted within said tube,
a sensor having a spherical configuration mounted on the end of said support remote from said base, and
means for maintaining said support and said tube at the same potential.

15. A probe as claimed in claim 14 including a thermocouple within the spherical sensor.

16. A probe for measuring the properties of ionized gases comprising
an electrically conducting primary sensor,
an electrically conducting shield surrounding said primary sensor,
means for electrically isolating said primary sensor from said shield,
means for maintaining said primary sensor and said shield at the same electrical potential,
first means for measuring the current in said sensor,
second means for measuring the current in said shield, and
a thermocouple mounted in said primary sensor thereby enabling the cycling rate of the electrical potential of said sensor to be varied to a rate where no temperature change over the voltage cycle is indicated.

References Cited

UNITED STATES PATENTS

| | | | |
|---|---|---|---|
| 1,670,640 | 5/1928 | Smith | 324—30 |
| 2,215,213 | 9/1940 | Ellis. | |
| 2,898,549 | 8/1959 | Miller | 324—30 |
| 3,038,118 | 6/1962 | Beckett | 324—33 |
| 3,042,862 | 7/1962 | Edgar et al. | 324—72.5 X |
| 3,056,926 | 10/1962 | Borck et al. | 324—72.5 X |
| 2,343,944 | 3/1944 | Wagenknecht | 343—902 X |
| 3,025,464 | 2/1962 | Bond | 324—61 |
| 3,115,602 | 12/1963 | Sutton et al. | 324—64 X |
| 3,277,429 | 10/1966 | Hammond | 343—902 X |
| 3,310,734 | 3/1967 | Hansen | 324—33 |

RUDOLPH V. ROLINEC, *Primary Examiner.*

C. F. ROBERTS, *Assistant Examiner.*

U.S. Cl. X.R.

313—146; 324—72.5, 149

PO-1050
(5/69)

UNITED STATES PATENT OFFICE
CERTIFICATE OF CORRECTION

Patent No. 3,447,071          Dated     May 27, 1969

Inventor(s)   James E. Webb for James F. Morris, Richard F. Tischler & Paul Beckman It is certified that error appears in the above-identified patent and that said Letters Patent are hereby corrected as shown below:

Column 8, line 8, cancel "aperture in substantial alignment with the"

Column 9, line 25, cancel "conducted" and insert therefor --conducting--

SIGNED AND
SEALED

OCT 21 1969

(SEAL)
Attest:

Edward M. Fletcher, Jr.
Attesting Officer

WILLIAM E. SCHUYLER, JR.
Commissioner of Patents